(12) United States Patent
Uchida et al.

(10) Patent No.: US 11,009,431 B2
(45) Date of Patent: May 18, 2021

(54) FAILURE MODE SPECIFYING SYSTEM, FAILURE MODE SPECIFYING METHOD, AND PROGRAM

(71) Applicant: HITACHI, LTD., Tokyo (JP)

(72) Inventors: Takayuki Uchida, Tokyo (JP); Tomoaki Hiruta, Tokyo (JP); Toshiaki Kono, Tokyo (JP); Yasuharu Namba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 333 days.

(21) Appl. No.: 16/185,059

(22) Filed: Nov. 9, 2018

(65) Prior Publication Data
US 2019/0162632 A1 May 30, 2019

(30) Foreign Application Priority Data

Nov. 28, 2017 (JP) .............................. JP2017-227408

(51) Int. Cl.
*G01M 99/00* (2011.01)
(52) U.S. Cl.
CPC ................................. *G01M 99/005* (2013.01)
(58) Field of Classification Search
CPC .................................................. G01M 99/005
USPC ....................................................... 702/185
See application file for complete search history.

(56) References Cited

U.S. PATENT DOCUMENTS

| | | | | |
|---|---|---|---|---|
| 6,308,138 | B1* | 10/2001 | Jones | G05B 19/4065 700/174 |
| 2006/0053123 | A1* | 3/2006 | Ide | G06F 16/35 |
| 2013/0132000 | A1* | 5/2013 | Tamaki | G06F 17/00 702/35 |
| 2014/0055274 | A1* | 2/2014 | Hatch | G05B 19/4065 340/679 |
| 2018/0232339 | A1* | 8/2018 | Tasaki | G06F 17/18 |

FOREIGN PATENT DOCUMENTS

JP 08-006635 A 1/1996

\* cited by examiner

*Primary Examiner* — Catherine T. Rastovski
*Assistant Examiner* — Aeysha N Sultana
(74) *Attorney, Agent, or Firm* — Mattingly & Malur, PC

(57) ABSTRACT

There is provided a failure mode specifying system or the like that suitably specifies a failure mode of an apparatus. A failure mode specifying system 10 includes a communication portion 11 that obtains data including a detection value of a sensor 22 which is installed in an apparatus 20, an apparatus structural parameter estimating portion 14 that estimates a predetermined apparatus structural parameter based on a structure and properties of the apparatus 20, based on the data which is obtained by the communication portion 11, a failure mode specifying portion 16 that specifies a failure mode indicating a kind of failure or failure sign of the apparatus 20, based on the apparatus structural parameter, and an input-output portion 18 that presents the failure mode which is specified by the failure mode specifying portion 16.

4 Claims, 10 Drawing Sheets

| COMPONENT | DETECTION TIME | STATE QUANTITY | DETECTION VALUE |
|---|---|---|---|
| MOTOR | 2012-10-01 10:00:00 | ELECTRIC CURRENT VALUE | 1.056 |
| MOTOR | 2012-10-01 10:00:00 | ROTATION SPEED | 30 |
| MOTOR | 2012-10-01 10:00:00 | VOLTAGE VALUE | 20.4 |
| MOTOR | 2012-10-01 10:00:01 | ELECTRIC CURRENT VALUE | 1.143 |
| MOTOR | 2012-10-01 10:00:01 | ROTATION SPEED | 31 |
| MOTOR | 2012-10-01 10:00:01 | VOLTAGE VALUE | 20.5 |
| .. | .. | .. | .. |
| SHAFT BEARING | 2012-10-01 10:00:00 | ACCELERATION | 0.56 |
| SHAFT BEARING | 2012-10-01 10:00:00 | TEMPERATURE METER | 24.4 |
| SHAFT BEARING | 2012-10-01 10:00:01 | ACCELERATION | 0.61 |
| SHAFT BEARING | 2012-10-01 10:00:01 | TEMPERATURE METER | 24.4 |
| .. | .. | .. | .. |

| COMPONENT | COMPONENT MODEL |
|---|---|
| MOTOR | d/dt (ELECTRIC CURRENT VALUE) = -(R/L) × (ELECTRIC CURRENT VALUE) - (K/L) × (ROTATION SPEED) + (1/L) × (VOLTAGE VALUE) |
| MOTOR | d/dt (ROTATION SPEED) = -(B/J) × (ROTATION SPEED) + (K/J) × (ELECTRIC CURRENT VALUE) |
| ⋮ | ⋮ |

| COMPONENT | FAILURE MODE | CRITERION | THRESHOLD VALUE |
|---|---|---|---|
| MOTOR | WINDING WIRE SHORT CIRCUIT OF COIL | R≤R1 OR L≤L1 | R1=7.6, L1=0.8 |
| MOTOR | WINDING WIRE DISCONNECTION OF COIL | R≥R2 | R2=14.8 |
| SHAFT BEARING | OUTER RING DAMAGE | ‥ | ‥ |
| SHAFT BEARING | INNER RING DAMAGE | ‥ | ‥ |

| ESTIMATION No | R | K | L | B | J |
|---|---|---|---|---|---|
| 1 | 10 | 0.23 | 1.1 | 5.6 | 34 |
| 2 | 11 | 0.32 | 1.3 | 5.4 | 35 |
| : | : | : | : | : | : |
| 99 | 11 | 0.27 | 1.4 | 4.2 | 35 |
| 100 | 12 | 0.3 | 1.2 | 3.0 | 35 |
| AVERAGE VALUE | 11.2 | 0.31 | 1.1 | 5.3 | 35 |
| STANDARD DEVIATION | 1.2 | 0.05 | 0.1 | 1.1 | 0.5 |

FAILURE MODE SPECIFYING SYSTEM, FAILURE MODE SPECIFYING METHOD, AND PROGRAM

TECHNICAL FIELD

The present invention relates to a failure mode specifying system or the like that specifies a failure mode of an apparatus.

BACKGROUND ART

As a technology of specifying a failure mode (kind of failure or failure sign) of an apparatus such as a mining machine or a construction machine, in addition to a gas engine or an elevator, for example, a technology which is disclosed in PTL 1 is known. That is, PTL 1 discloses a plant diagnosis apparatus that includes "means for monitoring an abnormality symptom by inputting an actual measurement signal and a simulated signal, and outputting a monitoring signal regarding presence or absence of the abnormality symptom based on a difference between both".

The "simulated signal" described above is a signal that is obtained by changing a coefficient of a physical model of the apparatus from normal time, and reproducing a behavior to indicate the abnormality symptom of the apparatus with simulation.

CITATION LIST

Patent Literature

PTL 1: JP-A-8-6635

SUMMARY OF INVENTION

Technical Problem

In PTL 1, after a designer or the like predicts a coefficient of a physical model in a case where the abnormality symptom is generated in the apparatus in advance, the simulation at the time of abnormality symptom is performed, using the physical model which includes the coefficient. However, in the coefficient of the physical model, there are many cases where a size thereof varies in accordance with installation environments, use conditions, and the like of the apparatus, in addition to a kind of abnormality symptom and status of progress.

In that case, if the designer or the like suitably sets the coefficient of the physical model at the time of abnormality symptom as PTL 1, there is a possibility that it is not possible to suitably specify a kind (failure mode) of abnormality sign according to circumstances. This is because the coefficient of the physical model which is set by the designer or the like may be too large, or may be too small. As a result, there is a possibility that it is determined to be not equivalent to any failure mode nevertheless the apparatus fails in actual.

An object of the present invention is to provide a failure mode specifying system or the like that suitably specifies a failure mode of an apparatus.

Solution to Problem

In order to solve the problems described above, a failure mode specifying system according to the present invention includes a data obtaining portion that obtains data including a detection value of a sensor which is installed in an apparatus, an apparatus structural parameter estimating portion that estimates a predetermined apparatus structural parameter based on a structure and properties of the apparatus, based on the data which is obtained by the data obtaining portion, a failure mode specifying portion that specifies a failure mode indicating a kind of failure or failure sign of the apparatus, based on the apparatus structural parameter which is estimated by the apparatus structural parameter estimating portion, and a presentation portion that presents the failure mode which is specified by the failure mode specifying portion.

Advantageous Effects of Invention

According to the present invention, it is possible to provide a failure mode specifying system or the like that suitably specifies a failure mode of an apparatus.

DESCRIPTION OF EMBODIMENTS

Embodiment

Figure 1:
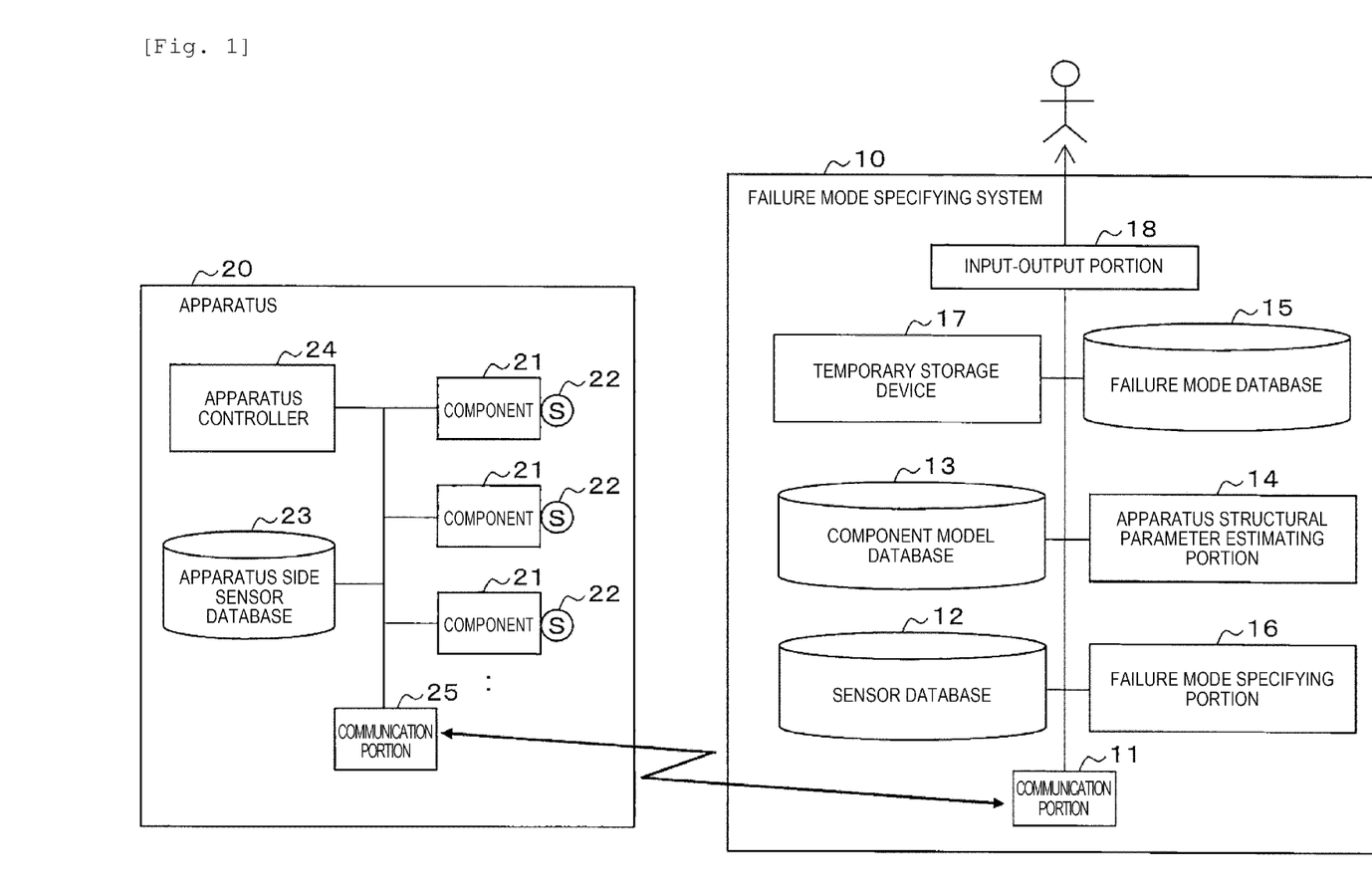
FIG. 1 is a functional block diagram including a failure mode specifying system according to an embodiment of the present invention.

FIG. 1 is a functional block diagram including a failure mode specifying system 10 according to an embodiment.

The failure mode specifying system 10 is a system that specifies a failure mode of an apparatus 20. The "failure mode" is a kind (for example, a winding wire short circuit of a coil, or winding wire disconnection of a coil, in a motor)

of failure or failure sign of the apparatus 20. The "failure sign" is a harbinger that the failure of the apparatus 20 is generated.

The failure mode specifying system 10 may be configured by one apparatus, or may be configured such that a plurality of apparatuses (a server and the like) are connected to each other through a signal wire or a network. Hereinafter, the apparatus 20 which is a target for specifying the failure mode will be simply described, before the description relating to the failure mode specifying system 10.

<Configuration of Apparatus>

The apparatus 20 is an apparatus such as a generator, an elevator, a building machine, or a medical instrument. The apparatus 20 includes a plurality of components 21, a plurality of sensors 22, an apparatus side sensor database 23, an apparatus controller 24, and a communication portion 25. As an example of the plurality of components 21, an electric circuit, piping, or the like may be used, in addition to a motor or a shaft bearing. The sensor 22 detects a predetermined physical quantity (temperature, pressure, electric current, voltage, rotation speed, acceleration, or the like) in the component 21, and is installed in the component 21.

Incidentally, not only the sensors 22 are installed one by one in each of the components 21, but also, for example, the plurality (a plurality of kinds) of sensors 22 may be installed in one component 21.

The apparatus side sensor database 23 is a database for recording each detection value of the sensor 22 which is installed in the component 21 as sensor data.

The apparatus controller 24 executes a predetermined control in the apparatus 20. The apparatus controller 24 has a function of recording the sensor data including each detection value of the sensor 22 in the apparatus side sensor database 23.

The communication portion 25 transmits predetermined sensor data which is recorded in the apparatus side sensor database 23 to the failure mode specifying system 10.

<Configuration of Failure Mode Specifying System>

The failure mode specifying system 10 is a system that specifies the failure mode of the apparatus 20, and presents a specified result thereof to a customer engineer or the like. For example, the failure mode specifying system 10 is configured to include electronic circuits such as a CPU (Central Processing Unit: not illustrated in the drawing), a ROM (Read Only Memory: not illustrated in the drawing), a RAM (Random Access Memory: equivalent to a temporary storage device 17 in FIG. 1), and various kinds of interfaces (not illustrated in the drawing). Therefore, a program which is stored in the ROM is read out, thereby, being developed in the RAM, and the CPU executes various kinds of processing.

As illustrated in FIG. 1, the failure mode specifying system 10 includes a communication portion 11 (data obtaining portion), a sensor database 12, a component model database 13, and an apparatus structural parameter estimating portion 14. The failure mode specifying system 10 includes a failure mode database 15, a failure mode specifying portion 16, the temporary storage device 17, and an input-output portion 18 (presentation portion), in addition to the configurations described above.

The communication portion 11 has a function of receiving a predetermined sensor data from the apparatus 20.

The sensor database 12 is a database that stores the sensor data which is received by the communication portion 11.

The component model database 13 is a database that stores a physical model (that is, a component model) of the component 21 relating to the sensor data. In other words, a mathematical expression including a predetermined state quantity which is detected by the sensor 22 is stored in the component model database 13 in advance, as a component model (see FIG. 3).

The apparatus structural parameter estimating portion 14 has a function of estimating an apparatus structural parameter. The "apparatus structural parameter" is a predetermined parameter based on a structure and properties of the apparatus 20 (one component 21 or the plurality of components 21), and is included in the above-described mathematical expression of the component model. Details of the component model and the apparatus structural parameter will be described later.

The failure mode database 15 is a database for associating the apparatus structural parameter described above with the failure mode of the apparatus 20.

The failure mode specifying portion 16 specifies (estimates) the failure mode of the apparatus 20, based on the apparatus structural parameter.

For example, the temporary storage device 17 is the RAM described above, and temporarily stores a predetermined arithmetic operation result.

The input-output portion 18 is a mouse, a keyboard, a touch panel, a liquid crystal display, or the like, and receives a predetermined input by the customer engineer, or presents the specified result of the failure mode to the customer engineer.

Next, data structures of the sensor database 12, the component model database 13, and the failure mode database 15 will be sequentially described.

Figure 2:
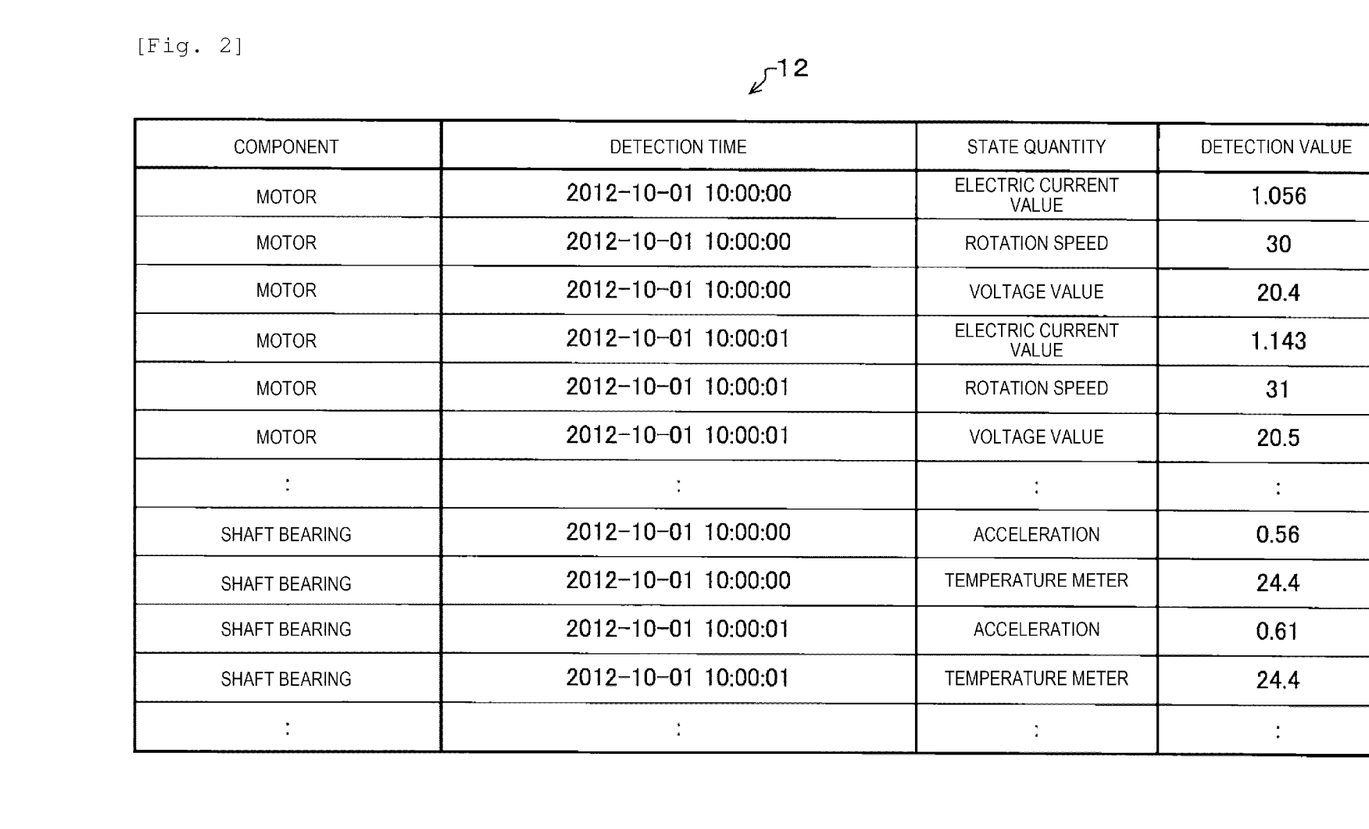
FIG. 2 is an explanatory diagram illustrating a data structure of a sensor database which is included in the failure mode specifying system according to the embodiment of the present invention.

FIG. 2 is an explanatory diagram illustrating the data structure of the sensor database 12.

As described above, in the sensor database 12, the detection value or the like of the sensor 22 (see FIG. 1) which is installed in the component 21 (see FIG. 1) is recorded, as predetermined sensor data. In the example illustrated in FIG. 2, the components 21, detection time of the sensor 22, the state quantity which is detected by the sensor 22, and the detection value of the sensor 22 are associated with each other, and are recorded as sensor data.

In the "component" illustrated in FIG. 2, identification information of the component 21 is also included, in addition to a general name (the motor, the shaft bearing or the like) thereof. In the example illustrated in FIG. 2, an electric current value, a rotation speed, a voltage value, or the like of the motor are stored, as a predetermined "state quantity" which is detected by the sensor 22 (see FIG. 1). In the data indicating the "state quantity", the identification information (sensor name) of the sensor 22 may be included.

Therefore, the state quantity or the like which is detected by the sensor 22, in addition to the component 21 or the detection time of the sensor 22, is used as a search key, thereby, the detection value thereof is referred.

Incidentally, the apparatus side sensor database 23 (see FIG. 1) which is included in the apparatus 20 (see FIG. 1) has the data structure that is the same as that of the sensor database 12 illustrated in FIG. 2.

Figure 3:
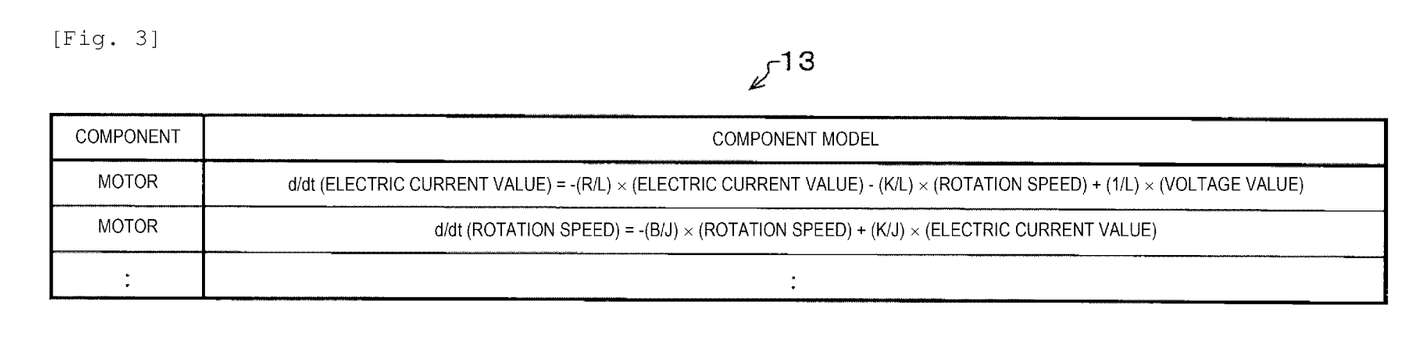
FIG. 3 is an explanatory diagram illustrating a data structure of a component model database which is included in the failure mode specifying system according to the embodiment of the present invention.

FIG. 3 is an explanatory diagram illustrating the data structure of the component model database 13.

In the component model database 13, the component model (a predetermined mathematical expression) of the component 21 relating to the sensor data described above is stored in advance. In the example illustrated in FIG. 3, Expression (1) is stored in advance, as one of the component models relating to the motor.

$$d/dt \text{ (electric current value)} = -(R/L) \times \text{(electric current value)} - (K/L) \times \text{(rotation speed)} + (1/L) \times \text{(voltage value)} \quad (1)$$

Expression (1) is the component model in which a differential value (left side) of the electric current value of the motor is equal to a sum (right side) of $-(R/L) \times$(electric current value), $-(K/L) \times$(rotation speed), and $(1/L) \times$(voltage value).

R in Expression (1) is a resistance value of the motor, L is inductance of the motor, and K is a torque constant of the motor. The resistance value R, the inductance L, and the torque constant K are the apparatus structural parameters based on the structure and the properties of the motor (that is, the apparatus 20 including the motor). On the other hand, the electric current value, the rotation speed, and the voltage value which are included in Expression (1) are detected by the sensor 22 (see FIG. 1) that is installed in the motor which is the component 21.

The component model illustrated in FIG. 3, as a predetermined text or program object, is stored in advance, and is loaded using the component 21 as a search key. For example, the component model is set by the customer engineer or the like, at the time of introducing the failure mode specifying system 10 (see FIG. 1) or the apparatus 20.

The apparatus structural parameter such as the resistance value R, the inductance L, or the torque constant K is hardly changed at normal time of the apparatus 20 (see FIG. 1), and is substantially fixed in general. The electric current value, the rotation speed, and the voltage value of Expression (1) are defined in accordance with sizes of the apparatus structural parameters.

On the other hand, in a case where the failure or the failure sign is generated in the apparatus 20, a predetermined apparatus structural parameter may be larger than that of normal time, or be smaller than that of normal time, in accordance with the failure mode thereof. In the present embodiment, the apparatus structural parameter estimating portion 14 (see FIG. 1) performs inverse estimation of the apparatus structural parameter, based on the sensor data such as the electric current value, the rotation speed, the voltage value, or the like of the motor. Therefore, the failure mode specifying portion 16 (see FIG. 1) specifies the failure mode of the apparatus 20, based on the apparatus structural parameter as an estimation result.

Figure 4:
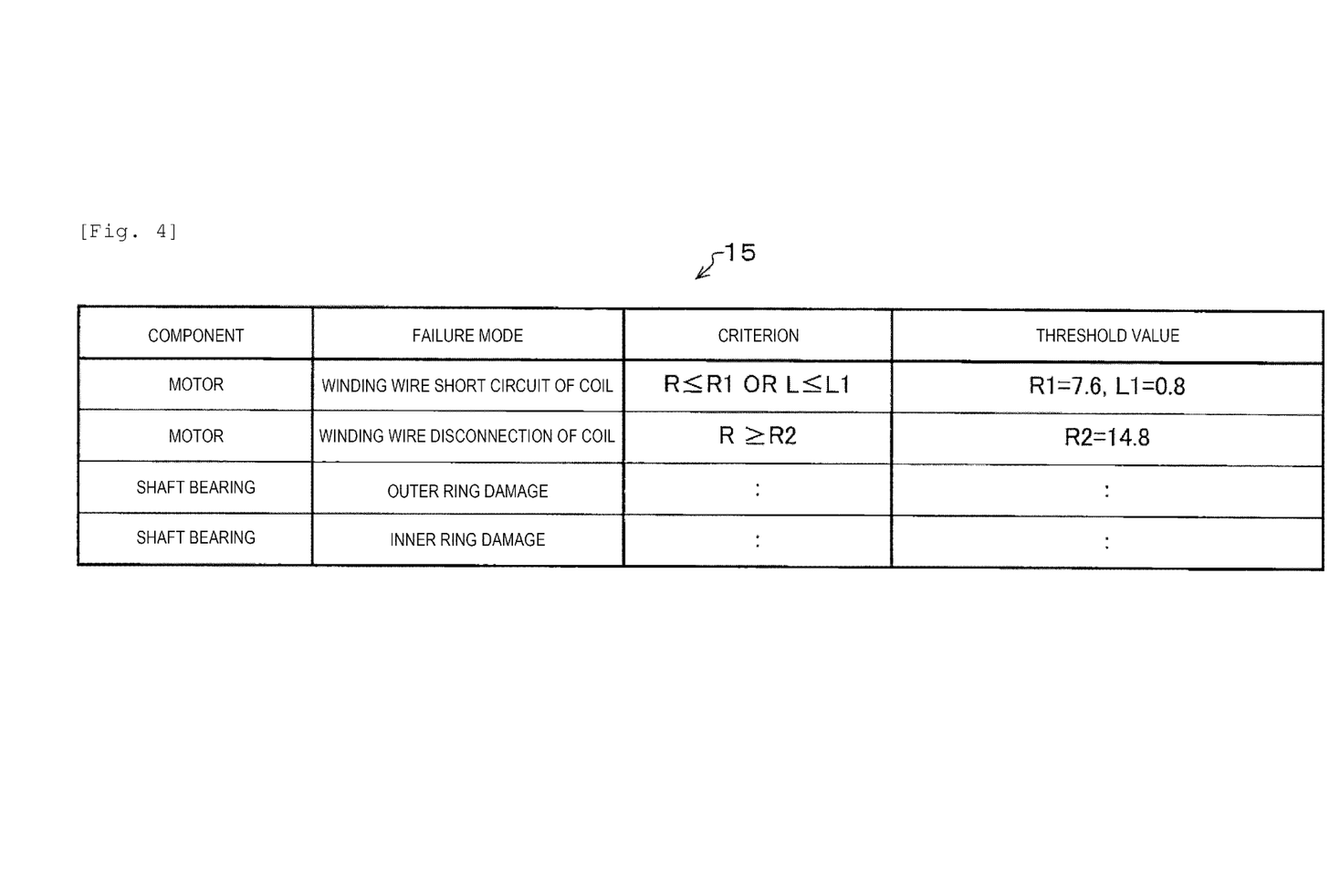
FIG. 4 is an explanatory diagram illustrating a data structure of a failure mode database which is included in the failure mode specifying system according to the embodiment of the present invention.

FIG. 4 is an explanatory diagram illustrating the data structure of the failure mode database 15.

In the example illustrated in FIG. 4, the component 21, the failure mode of the apparatus 20, a criterion at the time of specifying the failure mode, and a threshold value of the apparatus structural parameter which is included in the criterion are associated with each other, and are stored as failure mode database 15. Therefore, for example, the component 21 is used as a search key, thereby, the failure mode relating to the component 21, the criterion at the time of specifying the failure mode, or the like is searched.

In the example illustrated in FIG. 4, in a case where the resistance value R of the motor is a threshold value R1 or less, or in a case where the inductance L of the motor is a threshold value L1 or less, the failure mode specifying portion 16 (see FIG. 1) determines that "there is the winding wire short circuit of the coil".

If another example is further used, in a case where the resistance value R of the motor is a threshold value R2 or more, the failure mode specifying portion 16 (see FIG. 1) determines that "there is the winding wire disconnection of the coil".

In the failure mode database 15, the component 21, the failure mode, and the criterion of the failure mode are set by the customer engineer or the like, for example, at the time of introducing the failure mode specifying system 10 or the apparatus 20.

On the other hand, the failure mode specifying system 10 calculates the threshold value (specific numerical value) of the apparatus structural parameter, based on the sensor data when the apparatus 20 is known to be normal. That is, in a case where a predetermined failure mode (for example, the winding short circuit of the coil) is generated, there is no need to set (assume) the size of the threshold value of the apparatus structural parameter as long as the customer engineer or the like designates which apparatus structural parameter is larger than that of normal time, or is smaller than that of normal time. Therefore, it is possible to prevent erroneous determination of the failure mode which is caused by inaccuracy of the threshold value described above.

<Threshold Value Setting of Apparatus Structural Parameter>

Figure 5:
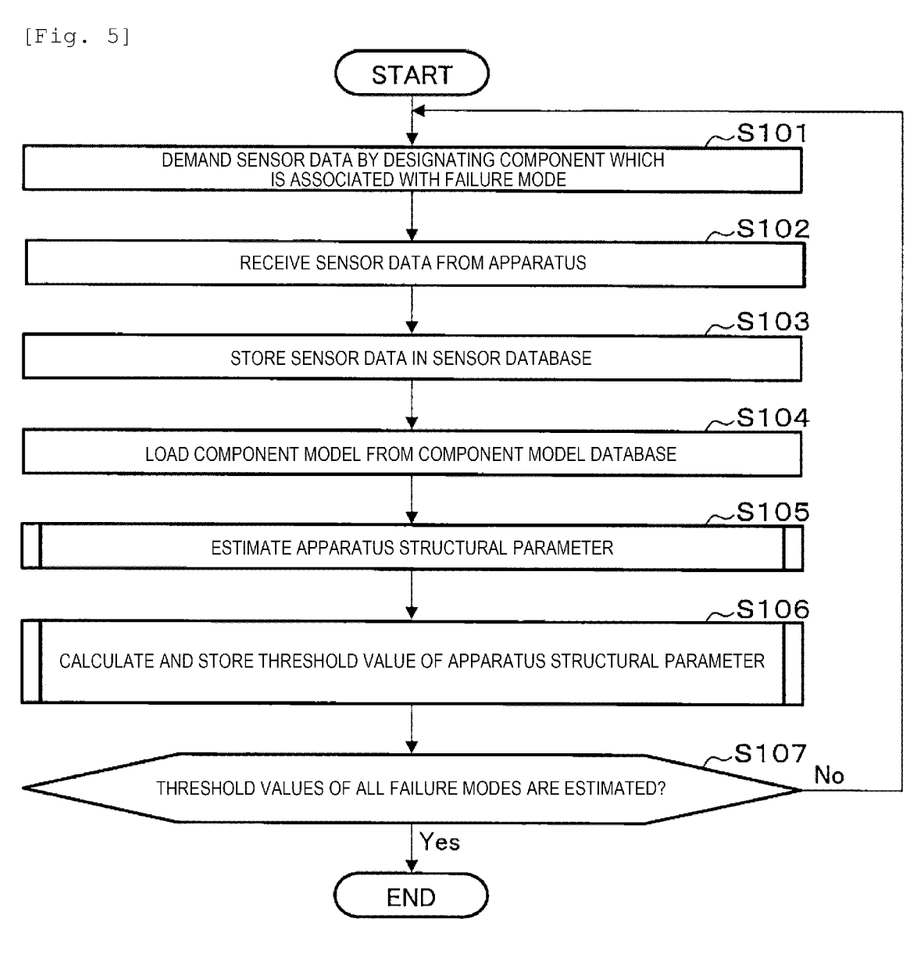
FIG. 5 is a flowchart of processing in which the failure mode specifying system according to the embodiment of the present invention sets a threshold value of an apparatus structural parameter.

FIG. 5 is a flowchart of processing of setting the threshold value of the apparatus structural parameter (suitably, see FIG. 1).

When a series of processings illustrated in FIG. 5 are performed, the apparatus 20 is known to normally work. For example, the processing illustrated in FIG. 5 is performed, immediately after mounting of the apparatus 20, or after the apparatus 20 is confirmed to be normal by inspection.

In step S101, the failure mode specifying system 10 designates the component 21 which is associated with the failure mode, and demands the sensor data from the apparatus 20. For example, the failure mode which is referred to as "winding wire short circuit of the coil" in the failure mode database 15 (see FIG. 4) is designated, by an operation of the customer engineer through the input-output portion 18.

In this case, the failure mode specifying system 10 designates the motor that is the component 21 which is associated with the "winding wire short circuit of the coil", and demands the sensor data relating to the motor from the apparatus 20. In other words, the failure mode specifying system 10 transmits a predetermined signal for demanding the electric current value, the rotation speed, and the voltage value (see the "component model" in FIG. 3) of the motor, to the apparatus 20 through the communication portion 11.

In a case where such a signal is received, although omitted in FIG. 5, the apparatus controller 24 reads out the sensor data in a predetermined time scope from the apparatus side sensor database 23, and further transmits the sensor data to the failure mode specifying system 10.

In step S102 of FIG. 5, the failure mode specifying system 10 receives the sensor data from the apparatus 20 through the communication portion 11.

In step S103, the failure mode specifying system 10 stores the sensor data which is received from the apparatus 20, in the sensor database 12.

In step S104, the failure mode specifying system 10 loads the component model from the component model database 13, using the component 21 which is demanded in step S101 as a search key. In the present embodiment, as an example, the component model of Expression (1) described above, and the component model (see FIG. 3) of Expression (2) described hereinafter are loaded.

$$d/dt \text{ (rotation speed)} = -(B/J) \times \text{(rotation speed)} + (K/J) \times \text{(electric current value)} \quad (2)$$

Expression (2) includes a frictional coefficient B, an inertia moment J, and the torque constant K of the motor, as an apparatus structural parameter.

Next, in step S105, the failure mode specifying system estimates the apparatus structural parameter, by the apparatus structural parameter estimating portion 14. For example, the failure mode specifying system 10 estimates five apparatus structural parameters which are included in the Expression (1) and Expression (2), using a least squares method, based on the sensor data including the rotation speed, the electric current value, and the voltage value of the motor. Five apparatus structural parameters are the resistance value R, the inductance L, the torque constant K, the frictional coefficient B, and the inertia moment J of the motor.

At the time of describing the estimation of the apparatus structural parameter using the least squares method, d/dt (electric current value) on the left side of Expression (1), or d/dt (rotation speed) on the left side of Expression (2) is referred to as an "objective variable". On the other hand, the electric current value, the rotation speed, and the voltage value which are variables on the right side of Expression (1) or Expression (2) are referred to as an "explanatory variable".

There are many cases where variation is generated in an estimation value of the apparatus structural parameter, due to an error of the sensor data. In the present embodiment, the apparatus structural parameter estimating portion 14 calculates an average value and a standard deviation (degree of the variation) of the apparatus structural parameter, based on a method of boost wrapping in statistics. The average value and the standard deviation are used at the time of setting the threshold value which becomes the criterion for determining whether or not the failure mode is equivalent to a predetermined failure mode. Such a series of processings will be described, using FIG. 6.

Figure 6:
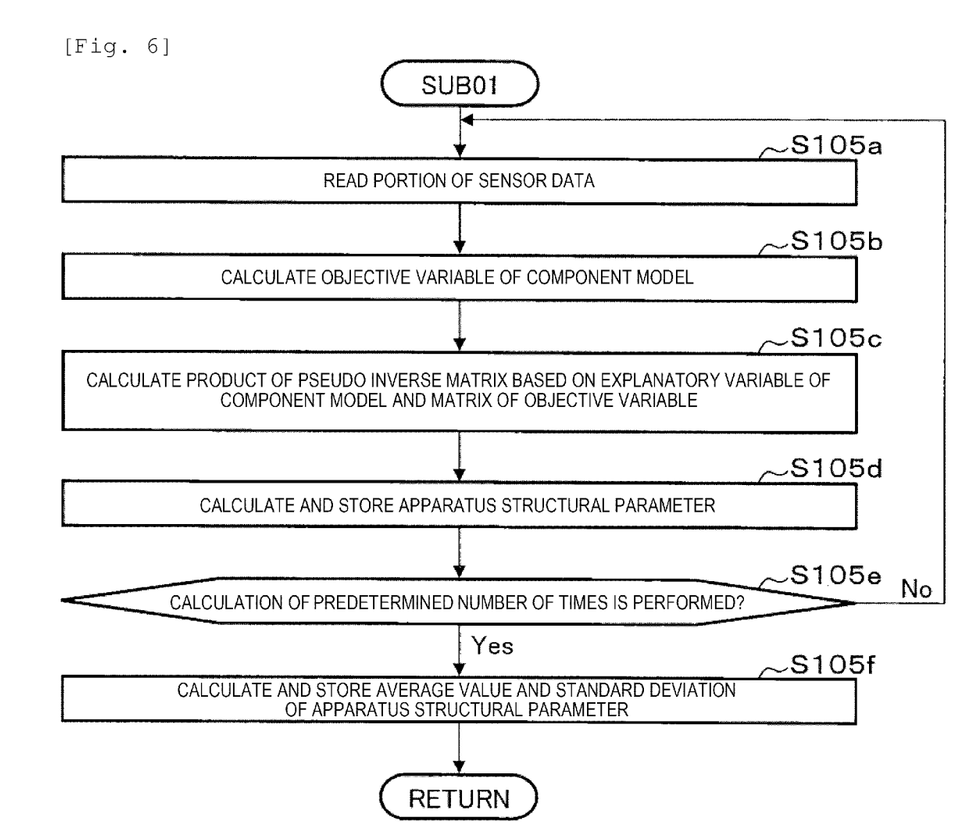
FIG. 6 is a flowchart of a subroutine which is equivalent to Step S105 in FIG. 5, in the failure mode specifying system according to the embodiment of the present invention.

FIG. 6 is a flowchart of a subroutine SUB01 which is equivalent to step S105 in FIG. 5 (suitably, see FIG. 1).

In step S105a of FIG. 6, the apparatus structural parameter estimating portion 14 reads a portion of the sensor data. That is, the apparatus structural parameter estimating portion 14 reads the sensor data by randomly extracting the sensor data which is detected in a predetermined time scope, based on the method of boost wrapping.

In step S105b, the apparatus structural parameter estimating portion 14 calculates the objective variable of the component model. For example, the apparatus structural parameter estimating portion 14 calculates the objective variable (differential value of the electric current value) of Expression (1), by taking a difference $\Delta i_t$ between an electric current value $i_t$ and an electric current value $i_{t+1}$ of the motor, and dividing the difference $\Delta i_t$ at a predetermined sampling time interval (for example, at an interval of one second). The subscript "t" of the electric current value $i_t$ is a number indicating a time-series sequence of the electric current value.

Therefore, the apparatus structural parameter estimating portion 14 generates a matrix Y of the objective variable in Expression (1), based on the differential value of the electric current value at each time, and stores the matrix Y in the temporary storage device 17 (see FIG. 1).

$$Y \stackrel{def}{=} \begin{bmatrix} \Delta i_1 \\ \Delta i_2 \\ \Delta i_3 \\ \vdots \end{bmatrix} \quad (3)$$

Furthermore, in step S105c, the apparatus structural parameter estimating portion 14 calculates a product of a pseudo inverse matrix based on the explanatory variable of the component model, and the matrix of the objective variable Y. First, the apparatus structural parameter estimating portion 14 generates the following matrix X, based on the electric current value $i_t$, a rotation speed $\omega t$, and a voltage value Vt relating to the component model of Expression (1) described above, which are the explanatory variables thereof.

$$X \stackrel{def}{=} \begin{bmatrix} i_1 & \omega_1 & V_1 \\ i_2 & \omega_2 & V_2 \\ i_3 & \omega_3 & V_3 \\ \vdots & \vdots & \vdots \end{bmatrix} \quad (4)$$

Therefore, the apparatus structural parameter estimating portion 14 calculates a pseudo inverse matrix $X^+$ of the explanatory variable, based on the matrix X of Expression (4).

$$X^+ = (X^T T)^{-1} X^T \quad (5)$$

Furthermore, the apparatus structural parameter estimating portion 14 calculates coefficients (R/L), (K/L), and (1/L) of the explanatory variable in Expression (1), based on the product of the pseudo inverse matrix $X^+$ and the matrix Y of the objective variable.

$$\begin{bmatrix} R/L \\ K/L \\ 1/L \end{bmatrix} = X^+ Y \quad (6)$$

Coefficients (B/J) and (K/J) of the explanatory variable in the component model of Expression (2) are calculated in the same manner.

In step S105d of FIG. 6, the apparatus structural parameter estimating portion 14 calculates and stores the apparatus structural parameter. As described above, five equations relating to the coefficients (R/L), (K/L), (1/L), (B/J) and (K/J) of the component model of Expression (1) and Expression (2) are obtained. Therefore, all values of five apparatus structural parameters R, K, L, B, and J are calculated, based on the equations. The apparatus structural parameter estimating portion 14 stores the apparatus structural parameters R, K, L, B, and J which are calculation results in the temporary storage device 17 (see FIG. 1).

Figure 7:
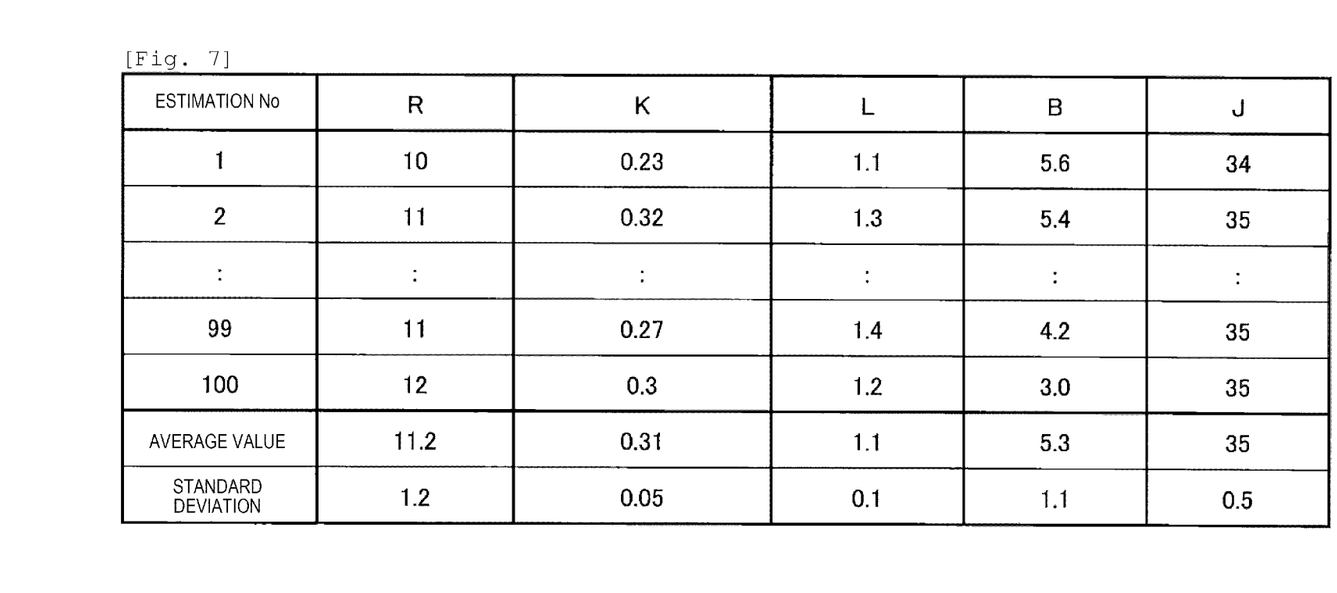
FIG. 7 is an explanatory diagram relating to an apparatus structural parameter which is stored in a temporary storage device of the failure mode specifying system according to the embodiment of the present invention.

FIG. 7 is an explanatory diagram relating to the apparatus structural parameter which is stored in the temporary storage device 17.

In FIG. 7, the apparatus structural parameter which is calculated (estimated) in a first time loop of 105a to S105e (see FIG. 6) is written in a column of "Estimation No. 1". In a second time loop to a 100-th time loop in the same manner as that, the apparatus structural parameter estimating portion also calculates and stores the apparatus structural parameter (S105d in FIG. 6), based on a portion of the sensor data which is randomly extracted (S105a in FIG. 6).

In step S105e of FIG. 6, the apparatus structural parameter estimating portion 14 determines whether or not the calculations of a predetermined number of times (for example, 100 times) are performed on the apparatus structural parameter.

In a case where the calculations of a predetermined number of times are performed in step S105e (S105e: Yes), the processing of the apparatus structural parameter estimating portion 14 proceeds to step S105f. On the other hand, in a case where the calculations of a predetermined number of times are not performed in step S105e (S105e: No), the processing of the apparatus structural parameter estimating portion 14 returns to step S105a.

In step S105f, after the apparatus structural parameter estimating portion 14 calculates and stores the average value and the standard deviation of the apparatus structural parameter, the apparatus structural parameter estimating portion 14 proceeds to the processing of step S106 in FIG. 5. In the columns on a lower side of FIG. 7, the calculation results of the average value and the standard deviation of the apparatus structural parameter R, K, L, B, or J are illustrated. In this manner, the apparatus structural parameter estimating portion 14 calculates the average value and the standard deviation of the apparatus structural parameter when the apparatus 20 is known to be normal.

In step S106 of FIG. 5, the failure mode specifying system 10 calculates and stores the threshold value of the apparatus structural parameter, by the apparatus structural parameter estimating portion 14. In other words, the failure mode specifying system 10 sets a threshold value of the apparatus structural parameter which becomes the criterion for determining whether or not the failure more is equivalent to a predetermined failure mode, based on the average value and the standard deviation of the apparatus structural parameter.

Figure 8:
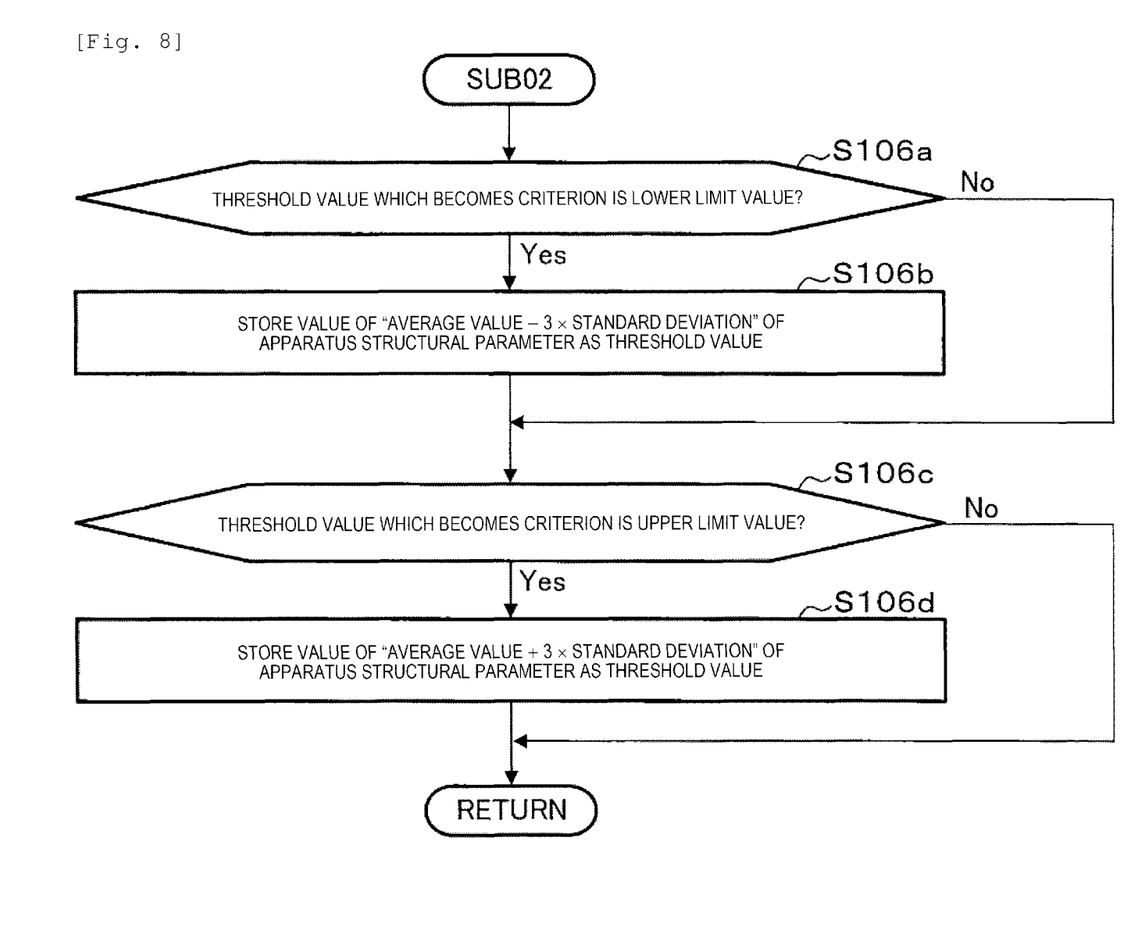
FIG. 8 is a flowchart of a subroutine which is equivalent to Step S106 in FIG. 5, in the failure more specifying system according to the embodiment of the present invention.

FIG. 8 is a flowchart of a subroutine SUB02 which is equivalent to step S106 in FIG. 5 (suitably, see FIG. 1).

In step S106a, the failure mode specifying system 10 determines whether or not the threshold value which becomes the criterion is a lower limit value. In a case where the threshold value which becomes the criterion is the lower limit value (S106a: Yes), the processing of the failure mode specifying system 10 proceeds to step S106b. On the other hand, in a case where THE threshold value which becomes the criterion is not the lower limit value (S106a: No), the processing of the failure mode specifying system 10 proceeds to step S106c.

As described above, in the failure mode database 15 (see FIG. 4), the information indicating a kind of the apparatus structural parameter which becomes the "criterion" of a predetermined failure mode (S101 in FIG. 5), and the information indicating whether the threshold value thereof is either of an upper limit value and a lower limit value are stored in advance. For example, the threshold value that becomes the criterion for determining the "winding wire short circuit of the coil" (see FIG. 4) which is one of the failure modes is set in advance to be the lower limit value R1 of the resistance value R of the motor, and the lower limit value L1 of the inductance L.

In step S106b, the failure mode specifying system 10 stores a value of "average value−3×standard deviation" of the apparatus structural parameter as a threshold value. In the apparatus structural parameter, there is the variation of approximately the average value±the standard deviation even at normal time of the apparatus 20. Therefore, the failure mode specifying system 10 sets the lower limit value, by leaving a margin of (standard deviation×3) than the average value. Thereby, it is possible to prevent the erroneous determination such that "failure mode is generated", when the apparatus 20 is actually normal.

For example, the lower limit value R1 of the resistance value R of the motor which becomes the criterion for determining the "winding wire short circuit of the coil" (see FIG. 4) is set as R1=7.6, which is the value obtained by subtracting a value of 3×the standard deviation (=1.2: see FIG. 7) from the average value (=11.2: see FIG. 7) thereof.

In this manner, in a case where a predetermined apparatus structural parameter is smaller than that of normal time, when it is set in advance to be determined that a predetermined failure mode is generated, the failure mode specifying system 10 performs the next processing by the apparatus structural parameter estimating portion 14. In other words, the failure mode specifying system 10 sets the threshold value of the apparatus structural parameter as a lower limit value, by subtracting a value which is obtained by multiplying the standard deviation of the apparatus structural parameter by a predetermined number of times (for example, three times) from the average value. Therefore, the failure mode specifying system 10 stores the threshold value which is the calculation result in the failure mode database 15 (see FIG. 4) (S106b).

In step S106c, the failure mode specifying system 10 determines whether or not the threshold value which becomes the criterion is the upper limit value. In a case where the threshold value which becomes the criterion is the upper limit value (S106c: Yes), the processing of the failure mode specifying system 10 proceeds to step S106d.

In step S106d, the failure mode specifying system 10 stores a value of "average value+3×standard deviation" of the apparatus structural parameter as a threshold value. For example, the upper limit value R2 of the resistance value R of the motor which becomes the criterion for determining the "winding wire disconnection of the coil" (see FIG. 4) is set as R2=14.8, which is the value obtained by adding the value of 3× the standard deviation (=1.2: see FIG. 7) to the average value (=11.2: see FIG. 7) thereof.

In this manner, in a case where a predetermined apparatus structural parameter is larger than that of normal time, when it is set in advance to be determined that a predetermined failure mode is generated, the failure mode specifying system 10 performs the next processing by the apparatus structural parameter estimating portion 14. In other words, the failure mode specifying system 10 sets the threshold value of the apparatus structural parameter as an upper limit value, by adding the value which is obtained by multiplying the standard deviation of the apparatus structural parameter by a predetermined number of times (for example, three times) to the average value. Therefore, the failure mode specifying system 10 stores the threshold value which is the calculation result in the failure mode database 15 (see FIG. 4) (S106d).

After the processing of step S106d is terminated, or in a case where the threshold which becomes the criterion is not the upper limit value in step S106c (S106c: No), the processing of the failure mode specifying system 10 proceeds to step S107 of FIG. 5.

In step S107, the failure mode specifying system 10 determines whether or not all failure modes which are stored in advance in the failure mode database 15 (see FIG. 4) are checked. In a case where all failure modes are checked in step S107 (S107: Yes), the failure mode specifying system 10 terminates the series of processings (END). On the other hand, in step S107, in a case where the failure mode which is not checked yet is present (S107: No), the processing of the failure mode specifying system 10 returns to step S101.

In this manner, the failure mode specifying system 10 calculates the threshold value (upper limit value or lower limit value) of the apparatus structural parameter with respect to each failure mode, and stores the calculation result thereof in the failure mode database 15 (see FIG. 4). The customer engineer or the like may finely adjust the threshold value of the apparatus structural parameter, by the operation through the input-output portion 18 (see FIG. 1).

Next, processing of determining whether or not a predetermined failure mode is generated in the apparatus 20, based on the threshold value of the apparatus structural parameter will be described. The processing is performed per predetermined time by the failure mode specifying system 10, during the work of the apparatus 20 which is a customer engineer service target.

Figure 9:
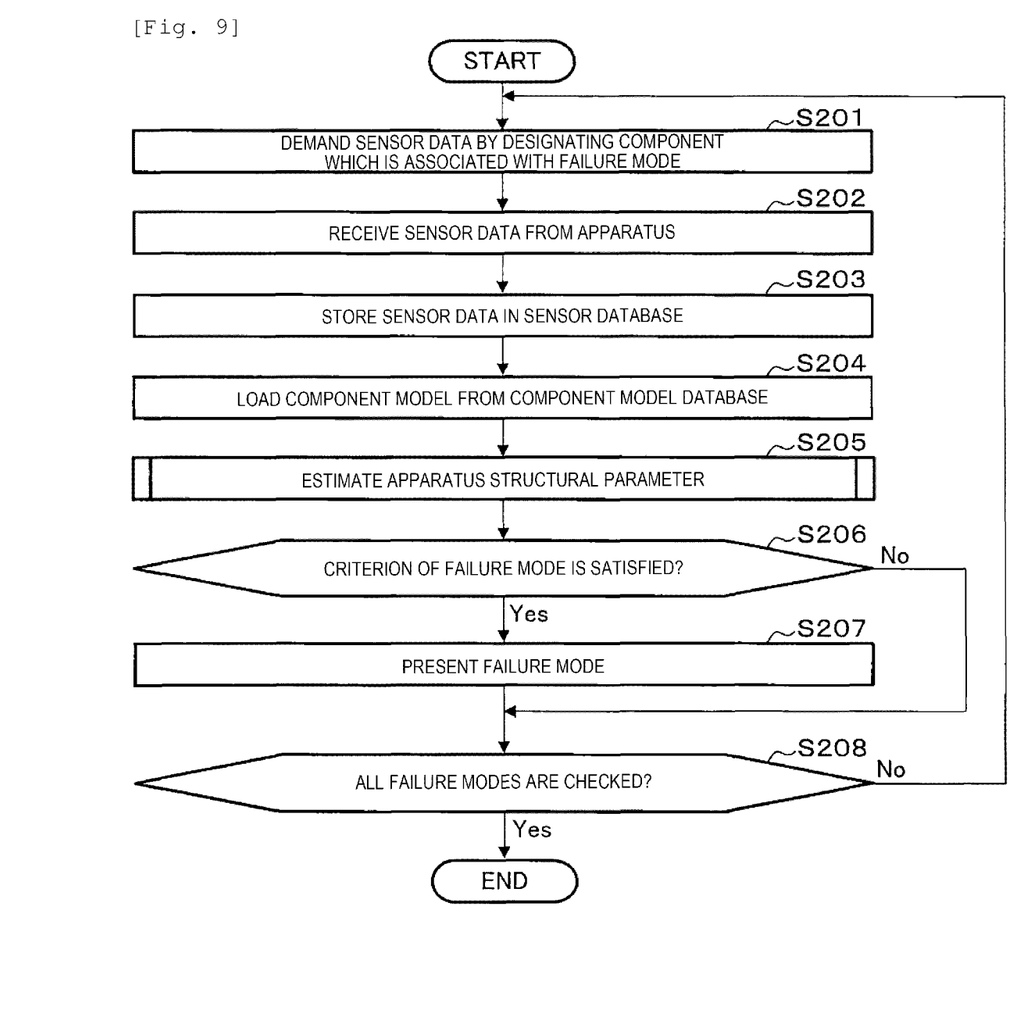
FIG. 9 is a flowchart of processing in which the failure mode specifying system according to the embodiment of the present invention specifies a failure mode of an apparatus.

FIG. 9 is a flowchart of the processing in which the failure mode specifying system 10 specifies the failure mode of the apparatus 20 (suitably, see FIG. 1).

In step S201, the failure mode specifying system 10 designates one (for example, the winding wire short circuit of the coil) of the failure modes illustrated in FIG. 4, designates the component 21 which is associated therewith, and demands the sensor data from the apparatus 20 through the communication portion 11 (data obtaining processing).

Step S202 to step S205 are processing (apparatus structural parameter estimating processing) for estimating the current apparatus structural parameters R, K, L, B and J, but are the same as S102 to S105 (see FIG. 5) described above. Accordingly, the detailed description thereof is omitted, but as described above, at least one of the plurality of components 21 which are included in the apparatus 20 is associated with a predetermined failure mode in advance (see FIG. 4). Therefore, the apparatus structural parameter estimating portion 14 estimates the apparatus structural parameter, based on the detection value of the sensor 22 which is installed in the component 21 corresponding to the failure mode.

In step S206, the failure mode specifying system 10 determines whether or not the current apparatus structural parameter satisfies the criterion (see FIG. 4) of a predetermined failure mode, by the failure mode specifying portion 16 (failure mode specifying processing). For example, if the failure mode which is designated in step S201 is the "winding wire short circuit of the coil", it is determined whether or not the current resistance value R of the motor is the threshold value R1 (=7.6) or less, or whether or not the inductance L is the threshold value L1 (=0.8) or less.

In this manner, the failure mode specifying portion 16 determines whether or not the failure mode is generated, based on whether a value of one apparatus structural parameter or a plurality of apparatus structural parameters associated with the failure mode is larger than that of normal time, or is smaller than that of normal time.

In a case where the current apparatus structural parameter satisfies the criterion of a predetermined failure mode in step S206 (S206: Yes), the processing of the failure mode specifying system 10 proceeds to step S207.

In step S207, the failure mode specifying system 10 presents the failure mode to the liquid crystal display or the like of the input-output portion 18 (presentation portion) (presentation processing).

Figure 10:
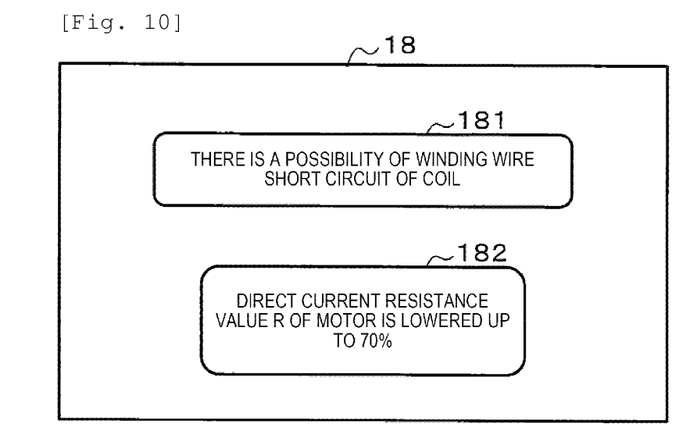
FIG. 10 is a screen display example in a case where a predetermined failure mode is generated in the apparatus, in the failure mode specifying system according to the embodiment of the present invention.

FIG. 10 is a screen display example in a case where a predetermined failure mode is generated in the apparatus.

In the example illustrated in FIG. 10, in a case where the winding wire short circuit of the coil (see FIG. 4) is generated in the motor of the apparatus 20 (see FIG. 1), a name 181 and a basis 182 of the failure mode are displayed.

As an example of the basis 182, a change ratio of the resistance value R to the threshold value R1 (or average value) is displayed such that "direct current resistance value R of the motor is lowered up to 70%". Thereby, the customer engineer can grasp that the winding wire short circuit of the coil (or the sign thereof) is generated in the motor of the apparatus 20. In other words, since the customer engineer can grasp a cause of the failure or the failure sign of the apparatus 20, it is possible perform a predetermined countermeasure in accordance therewith.

In step S208 of FIG. 9, the failure mode specifying system 10 determines whether or not all failure modes which are stored in advance in the failure mode database 15 (see FIG. 4) are checked. In a case where all failure modes are checked in step S208 (S208: Yes), the failure mode specifying system 10 terminates the series of processings (END). On the other hand, in step S208, in a case where the failure mode which is not checked yet is present (S208: No), the processing of the failure mode specifying system 10 returns to step S201.

<Effect>

According to the present embodiment, for example, in a case where a predetermined failure or failure sign is generated in the apparatus 20, it is possible to specify that the failure or failure sign is specifically which failure mode. Thereby, the customer engineer can grasp the cause (that is, failure mode) of the failure or the like, and can perform customer engineer work in accordance therewith.

It is possible to qualitatively specify the kind of apparatus structural parameter which is changed when a predetermined failure or the like is generated in the apparatus 20, or a direction (rise or fall) of the change in advance, based on the structure and the properties of the apparatus 20. According to the present embodiment, the customer engineer or the like sets the kind of the apparatus structural parameter which is associated with a predetermined failure mode, or whether the threshold value of the apparatus structural parameter is either of the upper limit value and the lower limit value in advance. Therefore, the failure mode specifying system 10 sets the threshold value (specific numerical value) of the apparatus structural parameter which is associated with the failure mode, based on the sensor data of the apparatus 20. Thereby, the failure mode specifying system 10 not only is capable of accurately specifying the failure mode which is generated in the apparatus 20, but also is capable of suitably supporting the customer engineer work by the customer engineer.

Hitherto, the failure or the like of the apparatus 20 is detected, based on the sensor data itself of the apparatus 20. However, in the sensor data in a case where the failure or the like of the apparatus 20 is actually generated, there is the variation in accordance with installation environments, use conditions, and the like of the apparatus 20. Even if it is clear that the failure or the like is generated in the apparatus 20, it is difficult to specify the specific failure mode from a waveform of the sensor data.

On the contrary, the failure mode specifying system 10 according to the present embodiment is capable of suitably specifying the failure mode which is generated in the apparatus 20, based on a predetermined apparatus structural parameter that is hardly changed at normal time. For example, when the apparatus 20 actually works (trially runs) on the spot, the threshold value of the apparatus structural parameter is set, based on the sensor data of the apparatus 20. Therefore, even if the installation environments and the use conditions vary per apparatus 20, it is possible to suitably set the threshold value of the apparatus structural parameter, by the failure mode specifying system 10. Furthermore, there is an advantage that advance simulation for setting the threshold value of the apparatus structural parameter is not necessary.

Modification Example

The failure mode specifying system 10 according to the present invention is described using the embodiments, but the present invention is not limited to the description thereof, and it is possible to perform various modifications.

For example, in each embodiment, the processing in which the failure mode specifying system 10 estimates the apparatus structural parameter based on the least squares method is described, but the present invention is not limited thereto. In other words, the apparatus structural parameter may be calculated, using a statistically known method such as Bayesian estimation.

In the embodiments, the processing in which the failure mode specifying system 10 specifies the failure mode of the apparatus 20 based on only the sensor data of the apparatus 20 is described, but the present invention is not limited thereto. For example, the failure mode specifying system 10 may estimate the failure mode, based on a control signal of the apparatus 20, an ON-OFF signal indicating a predetermined state of the apparatus 20, or an alarm signal, in addition to the sensor data of the apparatus 20. In other words, the communication portion 11 (data obtaining portion) may obtain the data including the detection value of the sensor 22 which is installed in the apparatus 20, and the apparatus structural parameter estimating portion 14 may estimate a predetermined apparatus structural parameter, based on the data.

In the embodiments, a case where all of five apparatus structural parameters R, K, L, B and J are calculated based on the least squares method is described, but the present invention is not limited thereto. For example, in a case where the apparatus structural parameter of which the value is not capable of being specified is present among the plurality of apparatus structural parameters (in a case where the number of unknown quantities is larger than the number of equations), the failure mode of the apparatus 20 may be specified, based on a ratio of the apparatus structural parameters.

In the embodiments, a case where the failure mode specifying system 10 sets the threshold value of the apparatus structural parameter based on the sensor data of the apparatus 20 which is mounted on the spot is described, but the present invention is not limited thereto. For example, the failure mode specifying system 10 may set the threshold value of the apparatus structural parameter, based on the sensor data of a testing machine (not illustrated in the drawing) which is equivalent to the apparatus 20.

A computer may execute a failure mode specifying method including the data obtaining processing (S201 and the like in FIG. 9), the apparatus structural parameter estimating processing (S205 and the like), the failure mode specifying processing (S206), and the presentation processing (S207) described above, by a predetermined program. It is possible to provide the program described above through a communication line, or it is possible to distribute the program described above by writing the program on a recording medium such as a CD-ROM.

Each embodiment is described in detail in order to describe the present invention in an easy-to-understand manner, and is not necessarily limited to the embodiment including all configurations which are described. It is possible to add, delete, or replace other configurations, with respect to a portion of the configuration of the embodiment. The mechanism or configuration which is considered to be necessary for the description is illustrated, and is not limited to a case where all mechanisms or all configurations are necessarily illustrated on goods.

REFERENCE SIGNS LIST

10: failure mode specifying system
11: communication portion (data obtaining portion)
12: sensor database
13: component model database
14: apparatus structural parameter estimating portion
15: failure mode database
16: failure mode specifying portion
17: temporary storage device
18: input-output portion (presentation portion)
20: apparatus
21: component
22: sensor
23: apparatus side sensor database
24: apparatus controller
25: communication portion

The invention claimed is:

1. A failure mode specifying system comprising:
a memory storing a program; and
a processor configured to execute the program to:
obtain data including a detection value of a sensor which is installed in an apparatus;
estimate a predetermined apparatus structural parameter based on a structure and properties of the apparatus, based on the data which is obtained by the data obtaining portion;
specify a failure mode indicating a kind of failure or failure sign of the apparatus, based on the apparatus structural parameter which is estimated; and
present the specified failure mode,
determine whether or not the failure mode is generated, based on whether a value of one apparatus structural parameter or a plurality of apparatus structural parameters associated with the failure mode is larger than or smaller than that of normal time,
calculate an average value and a standard deviation of the apparatus structural parameter when the apparatus is known to be normal, and set a threshold value of the apparatus structural parameter which becomes a criterion for determining whether or not the failure mode is equivalent to a predetermined failure mode, based on the average value and the standard deviation, and
determine, based on setting in advance, that the predetermined failure mode is generated in a case where the predetermined apparatus structural parameter is smaller than that of normal time, and set the threshold value of the apparatus structural parameter as a lower limit value, by subtracting a value which is obtained by multiplying the standard deviation by a predetermined number of times from the average value.

2. A failure mode specifying system comprising:
a memory storing a program; and
a processor configured to execute the program to:
obtain data including a detection value of a sensor which is installed in an apparatus;
estimate a predetermined apparatus structural parameter based on a structure and properties of the apparatus, based on the data which is obtained;
specify a failure mode indicating a kind of failure or failure sign of the apparatus, based on the apparatus structural parameter which is estimated;
present the specified failure mode,
determine whether or not the failure mode is generated, based on whether a value of one apparatus structural parameter or a plurality of apparatus structural parameters associated with the failure mode is larger or smaller than that of normal time,
calculate an average value and a standard deviation of the apparatus structural parameter when the apparatus is known to be normal, and set a threshold value of the apparatus structural parameter which becomes a criterion for determining whether or not the failure mode is equivalent to a predetermined failure mode, based on the average value and the standard deviation, and determine, based on setting in advance, that the predetermined failure mode is generated in a case where the predetermined apparatus structural parameter is larger than that of normal time, and set the threshold value of the apparatus structural parameter as an upper limit value, by adding a value which is obtained by multiplying the standard deviation by a predetermined number of times to the average value.

3. The failure mode specifying system according to claim 1, wherein at least one of a plurality of components which are included in the apparatus is associated with the failure mode in advance, and wherein the processor is further configured to estimate the apparatus structural parameter, based on the detection value of the sensor which is installed in the component corresponding to the predetermined failure mode.

4. A failure mode specifying method comprising:

obtaining data including a detection value of a sensor which is installed in an apparatus;

estimating a predetermined apparatus structural parameter based on a structure and properties of the apparatus, based on the data which is obtained by the data obtaining processing;

specifying a failure mode indicating a kind of failure or failure sign of the apparatus, based on the apparatus structural parameter which is estimated by the apparatus structural parameter estimating processing; and presenting the specified failure mode, determining whether or not the failure mode is generated, based on whether a value of one apparatus structural parameter or a plurality of apparatus structural parameters associated with the failure mode is larger or smaller than that of normal time, calculating an average value and a standard deviation of the apparatus structural parameter when the apparatus is known to be normal, and setting a threshold value of the apparatus structural parameter which becomes a criterion for determining whether or not the failure mode is equivalent to a predetermined failure mode, based on the average value and the standard deviation, and determining, based on setting in advance, that the predetermined failure mode is generated in a case where the predetermined apparatus structural parameter is smaller than that of normal time, and setting the threshold value of the apparatus structural parameter as a lower limit value, by subtracting a value which is obtained by multiplying the standard deviation by a predetermined number of times from the average value.

* * * * *